Sept. 3, 1940.　　　　R. H. SHAW ET AL　　　　2,213,851
HUMIDIFIER

Filed Jan. 5, 1939

Inventors:
Ray Harland Shaw
and Edgar E. Watson,
By Danning & Danning
Attorneys

Patented Sept. 3, 1940

2,213,851

UNITED STATES PATENT OFFICE 2,213,851

HUMIDIFIER

Ray Harland Shaw and Edgar E. Watson, Waterloo, Iowa, assignors to Metalectric Corporation, Waterloo, Iowa, a corporation of Iowa Application January 5, 1939, Serial No. 249,421

6 Claims. (Cl. 219—40)

This application is a continuation in part of application Serial No. 185,630, filed January 18, 1938.

The present invention is directed to a humidifier primarily intended for use in rooms which are designed for human occupancy, and the invention relates to that class of humidifiers which employs electrodes which are submerged in a body of water which serves as a conducting agency for the electric current.

The particular features to which the present invention is directed relate to the provision of a restricted body of water within which the electrodes are located and which is partially walled off from the main body of water in order to thus confine the heating effect of the electrodes mainly to the restricted body in order to secure quick evaporation, with the provision, however, for communication between the two bodies of water, so that the water level will be maintained uniformly throughout, and the water body subject to quick evaporation will be in part replenished from the main supply in the surrounding receptacle.

A further object of the invention is to so arrange and mount the electrodes that the water current flowing inwardly from the main supply chamber to the restricted evaporating chamber will be compelled to pass directly along the surfaces of the electrodes, so that a maximum of heating effect will be secured and a constant current flow maintained.

The invention further relates to the employment of a group of electrodes so arranged as to permit variation in the heating effect by varying the number and size of the active electrodes with a consequent variation in the current flow through the water body subjected to evaporation.

The invention further relates to the general structure of the device and the method of mounting the constituents thereof.

Further objects and details will appear from the description of the invention in conjunction with the accompanying drawing, wherein, Figure 1 is a longitudinal sectional elevation of one form of the humidifier of the present invention;

Figure 1:
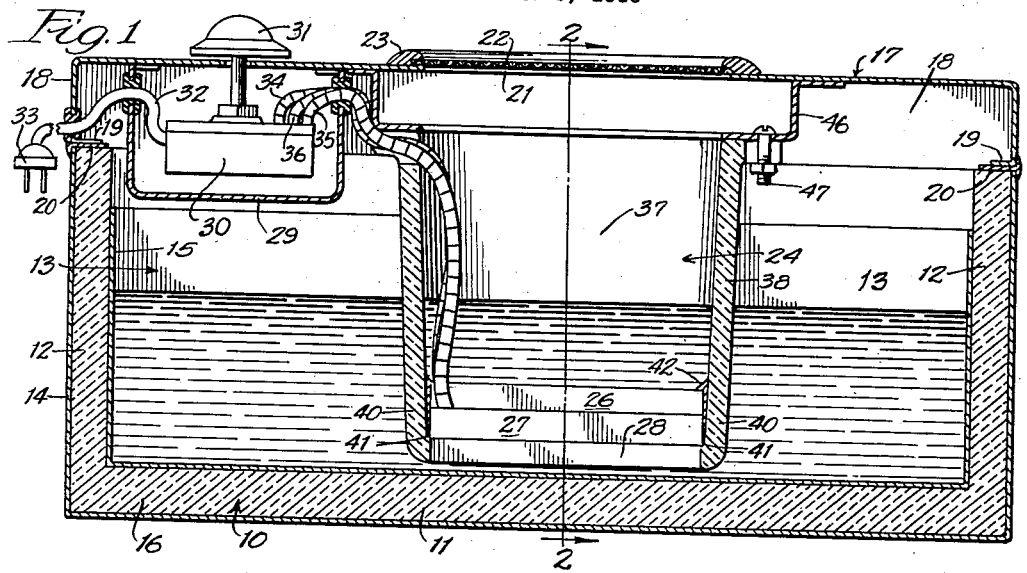

The humidifier as a whole comprises an outer receptacle 10 of rectangular boxlike formation, comprising a base wall or floor 11, end walls 12, and side walls 13. As shown, the outer receptacle is formed to provide an outer metallic sheath 14, an inner insulating lining 15, and an interposed body or packing 16 preferably of suitable material which affords an insulator against the passage of heat. The receptacle is closed by a metallic cover 17 of a size and shape to fit snugly over the upper side of the outer receptacle, being provided with marginal walls 18 inturned at their lower edges to provide flanges 19 which rest upon a T-shaped sealing strip or gasket 20 carried by the upper edges of the walls of the receptacle. The metal cover in its center is provided with an aperture 21 preferably covered by a grille or screen 22, the edges of which are mounted within a rim boss 23 which defines the outlet for the discharge of the vapors occasioned by the evaporation of the water.

Below the discharge aperture is located a depending inner well 24 which affords an inner chamber for a restricted supply of water immediately subject to the heating effect of a group consisting of electrodes 25, 26, 27, below which the inner well is provided with a base aperture 28 which establishes communication between the interior of the well and the surrounding chamber afforded by the outer receptacle. The details of construction and arrangement of the electrodes and their relation to the well constitute the principal features of the present invention which will be described more in detail presently.

The cover, outside of the well, has secured thereto a switch box 29 which carries a multiple switch 30 actuated by a button 31. The switch is supplied with current from a trunk cable 32 provided with a plug 33 adapted to be connected to any convenient source of electric current.

The switch box has leading therefrom three supply cables 34, 35, 36, which connect with the respective electrodes which are located near the base of the well 24. As shown, all of the electrodes are of rectangular plate formation standing edgewise, and the electrodes 25, 26 are of substantially twice the width vertically of the electrode 27, all of the electrodes, however, being of substantially equal length.

The switch 30 is of a standard commercial type which permits variable adjustments to be made in order to energize any two or all three of the electrodes in order to vary the evaporating capacity of the device. Thus, by proper adjustment of the button 31, the small electrode 27 and one of the larger electrodes, as for instance 26, can be thrown into circuit, which will give the minimum heating capacity for the group combination. Similarly, the larger electrodes 25, 26 can be thrown into circuit for a medium heating capacity, or all three of the electrodes can be thrown into circuit for the maximum heating capacity, depending upon variable adjustments of the button 31 in a manner well understood in the electrical art.

In order to concentrate the heating effect as much as possible upon a limited volume of water in immediate proximity to the electrodes, which water constitutes the conducting medium for the current flow between the electrodes, it is desirable to so locate a group of electrodes with respect to the inflowing current of water through the base aperture 28 that this current will be confined and directed along the opposed separated faces of the electrodes and thus subjected most thoroughly to the heating effect occasioned by the passage of the current through this confined body of water as a conductor. With this end in view, the inner well 24 is of converging or hopper formation, particularly at its lower end, and comprises converging side walls 37—37 and converging end walls 38—38, although the convergence of the end walls is considerably less than the convergence of the side walls to accommodate the group of electrodes which are elongated horizontally and of less width as a group than the length of the electrodes individually.

Figures 2, 3:
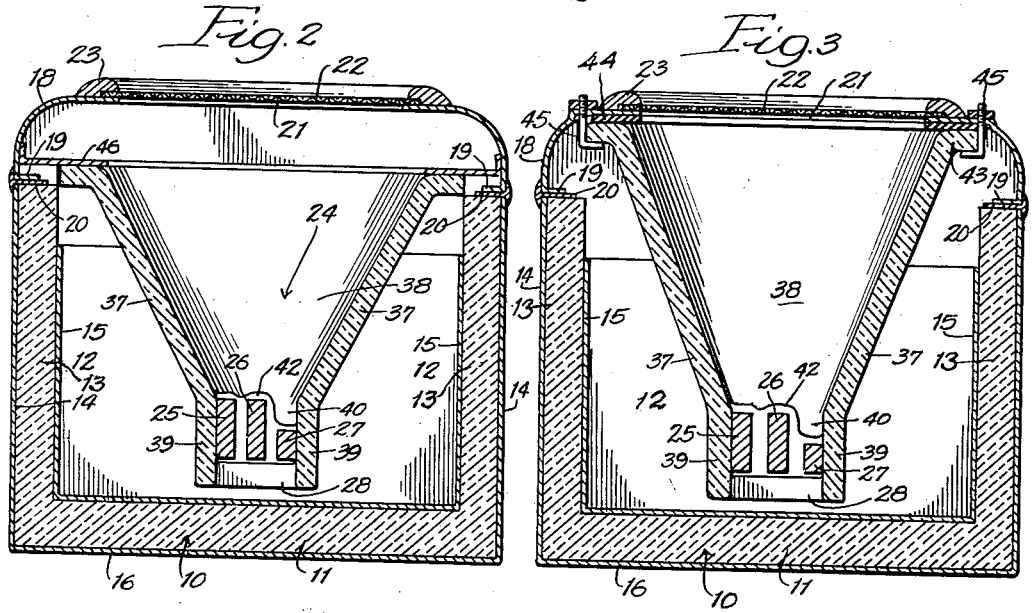
Fig. 2 is a cross sectional view of the same, taken on line 2—2 of Fig. 1.
Fig. 3 is a similar view showing an alternate form of the invention.

The inner well may be of the form shown in Fig. 2 or of the form shown in Fig. 3, although for most purposes the form shown in Fig. 3 is preferred. In the form shown in Figs. 1 and 2 the well is of rectangular formation in plan throughout; that is, any horizontal section would present a rectangular outline. In the form shown in Fig. 3, however, the rectangular form of the well at its lower end is progressively modified to a circular form at the upper end, so that the mouth of the receptacle immediately below the discharge orifice 21 conforms closely to the circular outline of said discharge orifice.

The well is preferably formed of glazed porcelain molded to the desired configuration, but whether the upper end be circular or rectangular is relatively unimportant so long as the converging lower end conforms substantially to the rectangular outline presented by the group of electrodes located near the base of the well. In either form of construction, the base portion of the well is rectangular in outline, or nearly so, comprising side wall extensions 39—39, and end wall extensions 40—40, although the latter, as shown in Fig. 1, have the same slight convergence characteristic of the upper portions of the end walls.

The aperture 28 extends throughout the base of the well, and the electrodes extend from end to end of the aperture and preferably rest upon a slight ledge 41 near the bottom of the end walls, the ends of the electrodes being imbedded and sealed within a suitable plastic sealing material 42, so that none of the water can by-pass around the ends of the electrodes. The outer sides of the electrodes 25 and 27 likewise fit snugly against the inner faces of the side walls extensions 39—39, so that water cannot by-pass along the outer sides of the outer electrodes.

The well is secured to and suspended from the cover in position to bring its lower end slightly above the base of the outer receptacle to provide for a water flow from the outer receptacle through the base aperture 28 and up into the interior of the well, and the method of securing and suspending the well may be that shown in Fig. 3 or the alternate form shown in Figs. 1 and 2. In the form shown in Fig. 3, the upper circular end of the well is provided with a surrounding flange 43 which abuts against a gasket 44 surrounding the discharge aperture 21, and the flange is engaged by bracket hooks 45, or any other suitable fastening means of like or equivalent character.

In the form of construction shown in Fig. 1, the well terminates below the top of the cover, and its upper rim is secured to a depending collar 46 by bolts 47 or equivalent attaching means. In this case the collar 46 serves as a partition wall to direct the vapors from the well and through the discharge aperture 21.

In use, the water is supplied to the outer receptacle in an amount sufficient to provide for an extended period of operation and to provide an inner body of water deeply submerging the electrodes located at the base of the well. Thereafter, the current is turned on to the desired degree which brings any two or three of the electrodes into service. Since the current flow through the water gap will be proportionate to the surface area which is energized, it is possible to reduce the current flow to a minimum amount by energizing the electrodes 26 and 27, which present a minimum surface area across the water gap. Likewise, a more extended surface area will be presented when the larger electrodes 25 and 26 are energized and a maximum surface area when all three electrodes are brought into service.

The current flow will heat the water confined in the base of the well and thus establish an upward convection current through the aperture 28 in the base of the well, but the inflowing water will be limited in amount and confined closely to the region immediately adjacent the energized surfaces of the electrodes, so that when all three of the electrodes are in service none of the water will be by-passed through channels remote from the energized surfaces, thereby securing a maximum heating effect both by reason of the energized area presented by the electrodes and by the confinement of the water currents to the energized region. The rapidity of the evaporation will also be increased by the confinement of the limited volume of water within the inner well as compared with the larger volume contained as a reserve supply within the outer receptacle, so that a rapid and uniform evaporation will be occasioned by reason of the arrangement and location of the electrodes in relation to the configuration of the well within which they are located.

Furthermore, by the provision of a flaring or hopper shaped well, the area of the water surface above the electrodes will be increased to a desirable degree, which facilitates the easy escape of the vapors from the surface without undue disturbance or ebullition, so that, by providing a close confinement for the water in the region immediately subjected to the heating effect and providing an extended surface for the escape and discharge of the vapors, a given amount of current energy will be utilized most advantageously in the carrying out of the purpose for which the invention is designed. It will also be noted that the electrodes are located a short distance above the floor of the outer receptacle, so that when the water becomes exhausted by evaporation to a point below the electrodes, the current will automatically be cut off irrespective of the operation of the switch.

Although the invention has been described with particularity as to detail, and although the form and arrangement of the well and electrodes as shown have proved highly advantageous, it is not the intention, unless otherwise indicated in the claims, to limit the invention to the exact form or arrangement shown, since modifications may be made without departing from the spirit of the invention.

We claim:

1. In a humidifier, the combination of a receptacle adapted to contain liquid subject to evaporation, a restricted chamber within said receptacle and provided in its base with an aperture for permitting the liquid to flow between the receptacle and the restricted chamber, and a group of at least three spaced electrodes of plate formation standing in edgewise relation at the base of the receptacle and presenting their ends in contact with the walls of the restricted chamber adjacent said aperture to compel the liquid flowing through the aperture to maintain close contact with the faces of the electrodes, and means for selectively energizing the electrodes.

2. In a humidifier, the combination of a receptacle adapted to contain liquid subject to evaporation, a restricted chamber of downwardly converging formation within said receptacle and provided in its base with an aperture for permitting the liquid to flow between the receptacle and the restricted chamber, and a group of at least three spaced electrodes of plate formation standing vertically in edgewise relation and presenting their lower edges across the aperture in the base and having their ends in contact with the walls of the restricted chamber adjacent said aperture to compel the liquid flowing through the aperture to maintain close contact with the side faces of the electrodes, and means for selectively energizing the electrodes.

3. In a humidifier, the combination of a receptacle adapted to contain liquid subject to evaporation, a cover for said receptacle, a restricted chamber in the form of a well suspended from said cover and depending into the receptacle and provided in its base with an aperture for permitting the liquid to flow between the receptacle and the restricted chamber, and a group of at least three spaced electrodes of plate formation standing in edgewise relation at the base of the restricted chamber and presenting their edges across the aperture in the base and having their ends in contact with the walls of the restricted chamber adjacent said aperture to compel the liquid flowing through the aperture to maintain close contact with the side faces of the electrodes, and means for selectively energizing the electrodes.

4. In a humidifier, the combination of a receptacle adapted to contain liquid subject to evaporation, a cover for said receptacle, a restricted chamber in the form of a well suspended from said cover and depending into the receptacle and being of downwardly converging formation and provided in its base with an aperture for permitting the liquid to flow between the receptacle and the restricted chamber, and a group of at least three spaced electrodes of plate formation standing vertically in edgewise relation at the base of the restricted chamber and presenting their lower edges across the aperture in the base and having their ends in contact with the walls of the restricted chamber adjacent said aperture to compel the liquid flowing through the aperture to maintain close contact with the side faces of the electrodes, and means for selectively energizing the electrodes.

5. In a humidifier, the combination of a receptacle adapted to contain liquid subject to evaporation, a group of at least three electrodes standing in spaced relation within the receptacle and in position to bring their opposed faces in unobstructed relation toward one another within the liquid, and means for selectively closing an energizing circuit through any opposed two or all of the electrodes within the group to confine the flow of current through the electrode areas in closed circuit relation through the intervening liquid.

6. In a humidifier, the combination of a receptacle adapted to contain liquid subject to evaporation, a group of at least three electrodes standing in spaced relation within the receptacle and in position to bring their opposed faces in unobstructed relation toward one another within the liquid, certain electrodes of the group being of differing surface area, and means for selectively closing an energizing circuit through any opposed two or all of the electrodes within the group to confine the flow of current through the electrode areas in closed circuit relation through the intervening liquid.

RAY HARLAND SHAW.
EDGAR E. WATSON.